Figure 4:
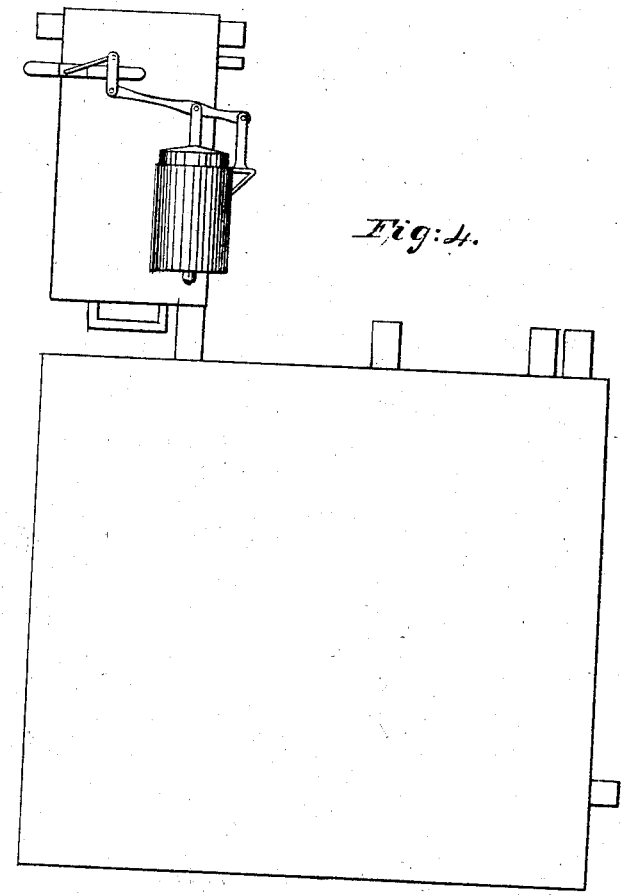

PRENTISS & ROBERTSON.
Apparatus for Distilling and Rectifying Whisky.
No. 48,436. 3 Sheets—Sheet 1. Patented June 27, 1865.
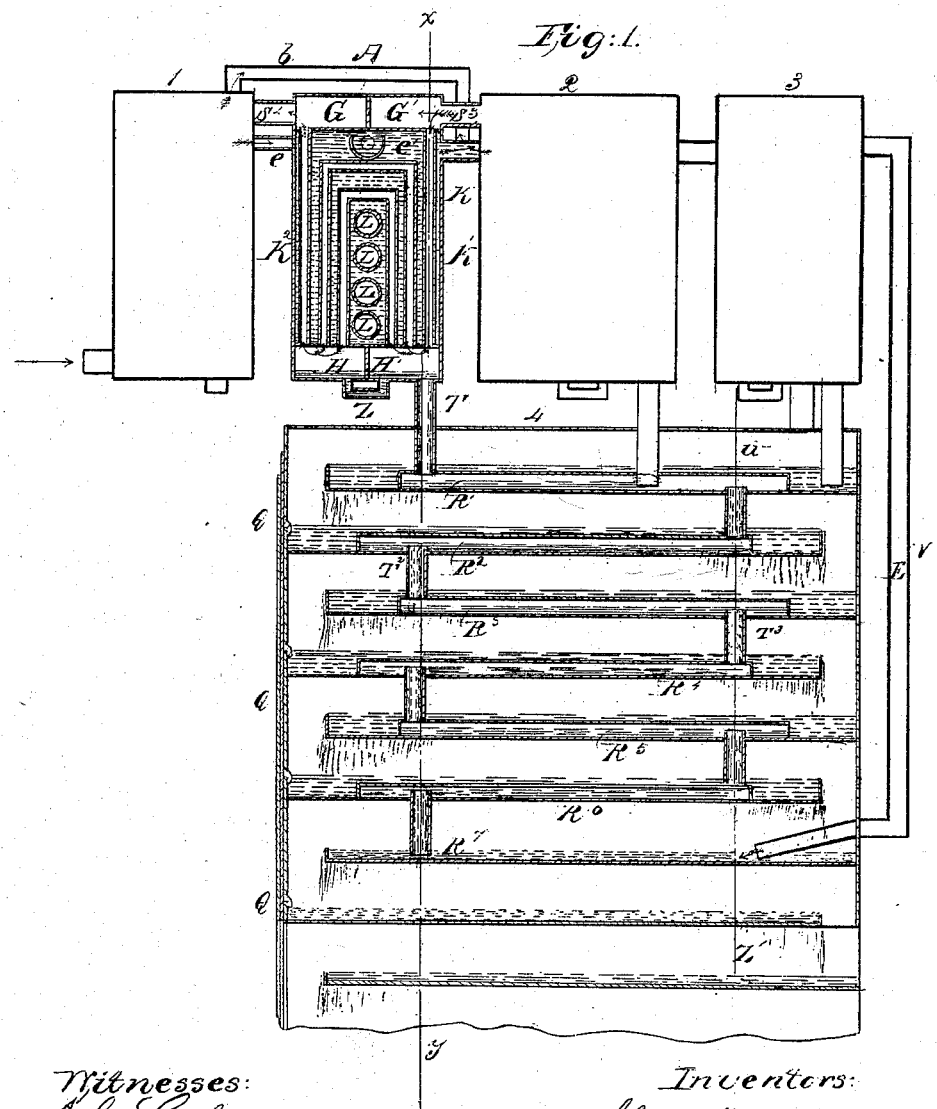

PRENTISS & ROBERTSON.
Apparatus for Distilling and Rectifying Whisky.
No. 48,436. Patented June 27, 1865.
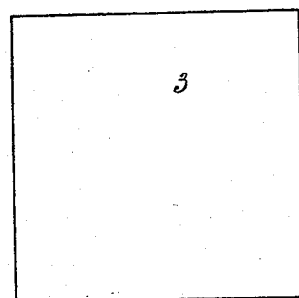
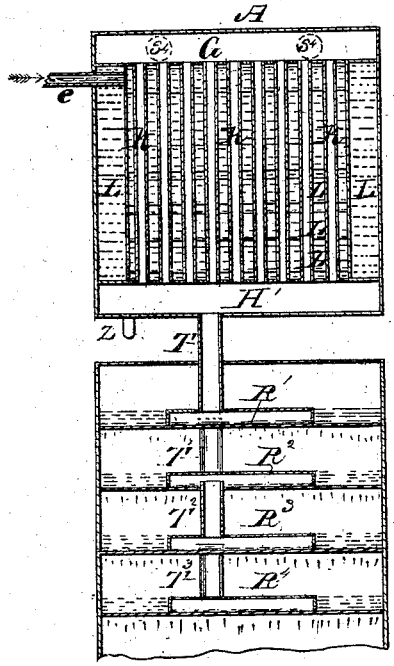
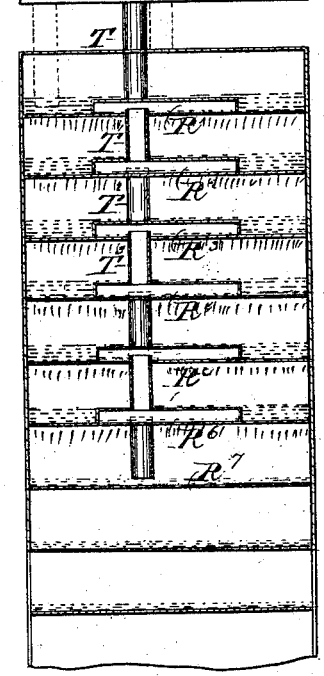

PRENTISS & ROBERTSON.
Apparatus for Distilling and Rectifying Whisky.

No. 48,436.

3 Sheets—Sheet 3.

Patented June 27, 1865.

UNITED STATES PATENT OFFICE.

ELIJAH FREEMAN PRENTISS AND ROBERT ADAM ROBERTSON, OF PHILADELPHIA, PENNSYLVANIA.

IMPROVED APPARATUS FOR DISTILLING AND RECTIFYING WHISKY.

Specification forming part of Letters Patent No. 48,436, dated June 27, 1865.

*To all whom it may concern:*

Be it known that we, ELIJAH FREEMAN PRENTISS and ROBERT ADAM ROBERTSON, both of the city of Philadelphia, State of Pennsylvania, have invented certain new and useful Improvements in Apparatus for Distilling and Rectifying Whisky and other Spirits; and we do hereby declare that the following is a full, clear, and exact description of the same, reference being had to the annexed drawings, forming a part hereof.

The improvements herein described relate to the apparatus for which Letters Patent of the United States were granted to us on the 1st day of March, 1864.

In the drawings, Figure 1 is a front view of the improvements, (front sides off,) the chambers marked 1, 2, and 3 in the drawings annexed to the said Letters Patent, also a portion of the chamber marked 4 in the last-mentioned drawings, being shown in their proper relative positions, and being outlined in red ink. Fig. 2 is a vertical section through chambers A and 4 on the line $x\,y$, Fig. 1. Fig. 3 is a vertical section of chamber 4 on the line $W\,Z'$, Fig. 1. Fig. 4 is a side view of a thermostat described in the specification of our said Letters Patent, with an arrangement of levers which renders the instrument more sensitive to variations of temperature.

The object of our improvements is to produce a stronger and purer spirit than is produced by our said patented apparatus, and we effect the desired result by employing, first, a chamber in addition to the chambers described and shown in the specification and drawings of our said Letters Patent; second, by providing the upper shelves of the head or chamber therein named "chamber 4" with boxes, placed either on the upper or under surface of the shelves, but preferably on the upper surface, as shown in the drawings.

To enable others skilled in the art to make and use our improvements, we will proceed to describe them and their mode of operation in detail.

Between the chambers 1 and 2 we place the additional chamber A, which is of the size of chamber 1 or chamber 2. This chamber A is provided with air-spaces L, similar in their arrangement to the air-spaces in chamber 2, and are for a similar purpose—to wit, for regulating the temperature to any desired degree. We employ for chamber A a regulator or thermostat similar to that described as applied to chamber 2 in our said Letters Patent, to command a cock or valve in the pipe $e$ for the purpose of admitting exactly the quantity of cooling-liquor necessary to preserve this chamber at the desired heat.

$b$, Fig. 1, is a pipe two inches in diameter, to conduct from chamber 1 the quantity of partially-heated wash necessary, in addition to what passes through the chamber A, to regulate chamber 2 to the desired heat.

G G' H H' are vapor-spaces corresponding in size to the similar spaces in chambers 2 and 3. The vapor coming from chamber 2 through the pipe $S^3$, as shown by the arrows, enters the space G' and passes through one or more rows of tubes, K, each of one-half inch diameter, to the space H'; thence through rows of bent pipes K', each of one-half inch diameter, and extended up high enough to pass over the uppermost air-pipe, L, into space H; thence up through one or more rows of tubes, $K^2$, into the space G, whence it passes through the pipe $S^4$, of four inches diameter, into chamber 1, where it is finally condensed, as described in the specification of said Letters Patent.

$e$ is a pipe two inches in diameter, to convey the wash from chamber 1 into the level trough $e'$, of much more cross-sectional area than that of the entering pipe, and running from end to end of chamber A. This trough is for the purpose of holding the wash until it is partially heated, and for regularly distributing the wash or cooling medium over all the vapor-pipes $k$ and the air-pipes L. This mode of distributing the cooling medium can be applied in each of the chambers 2 and 3.

The spaces G G' may have inserted into them drawers with wire-gauze bottoms and tops, to contain materials for deodorizing, purifying, and flavoring the spirit as it passes through them in a state of vapor.

The weaker alcohol condensed in the vapor-tubes K of chamber A falls down into the spaces H and H', which are connected by the inverted siphon Z, and passes down through a large pipe, T, into the top of an inclosed shallow box, R', placed on the bottom of the uppermost shelf of chamber 4. We prefer to make this box large enough to occupy one-half the superficial area of the shelf, and of such a depth that the condensed weaker alcohol coming from chambers 2 and 3 shall cover it, and this applies to the other similar boxes used. A pipe, T', of four inches diameter leads from the box R' to the box R². The top of this pipe T' projects a little above the bottom of the box R', so as to keep said bottom covered with the weaker alcohol to any desired depth. From the box R' the condensed hydrated alcohol flows through the pipe T', of four inches diameter, into the box R², thence through the pipe T² into the box R³, and so on through as many similar boxes as it may be desired to use; and from the lowermost box it joins the current of wash that descends from chamber 3 through the pipe E'. The hydrated alcohol, as it passes down from box to box, is submitted to an increased temperature at every box, the more alcoholic portions of it being vaporized and passing back through the pipes T' T into the chamber A, which, by being kept at a temperature lower than that of chamber 2, more perfectly dehydrates the alcohol; and from chamber A the vapor passes through the pipes K K' K² into chamber 1, where it is finally condensed.

One side of chamber 4 is made as shown at Q, Fig. 1, so that it can be taken off whenever it becomes necessary to clean the shelves.

In the drawings the light-blue color inside the boxes R' and R², &c., represents the condensed alcohol from chamber A. The dark-blue color surrounding the boxes R' and R², &c., represents the weaker alcohol condensed from chambers 2 and 3. The pink color represents the wash and the yellow color the air-spaces.

Having now fully described the nature of our invention and how we believe the same may be best carried into practical effect, we wish it to be understood that we do not confine ourselves to the precise details, relative proportions, and dimensions hereinbefore described, as it will be readily seen that the same may be considerably varied without departing from the principle of the invention; but

What we do claim is—

1. The employment of chamber A, constructed substantially as described, and having a separate regulator, so that the said chamber can be maintained at any desired temperature lower than that of chamber 2, for the purpose of more effectually dehydrating the alcohol.

2. The employment of boxes R' R², &c., attached to the upper shelves in chamber 4, in the manner and for the purpose substantially as described.

3. The trough e', in combination with the pipe e and chamber A, arranged, constructed, and operating substantially as described.

ELIJAH FREEMAN PRENTISS.
ROBERT ADAM ROBERTSON.

Witnesses:
JOHN LATHROP,
J. E. SHAW.